Dec. 21, 1937.　　　　O. E. SZEKELY　　　　2,102,923
DRIVING AND SUPPORTING ASSEMBLY FOR AUTOMOTIVE VEHICLES
Filed Feb. 28, 1936　　　3 Sheets-Sheet 1
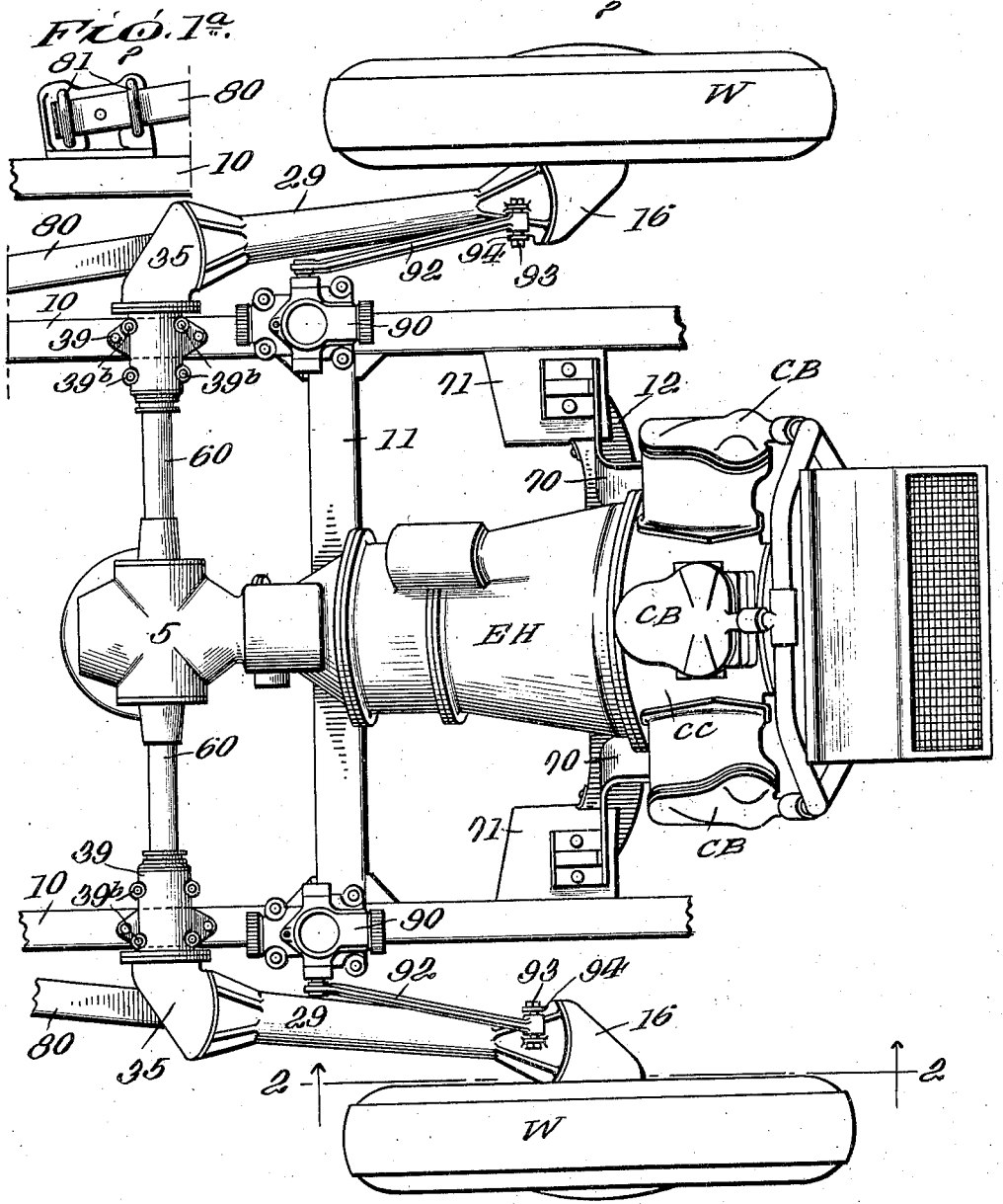
Inventor
Otto E. Szekely,
By
Mason Porter
Attorneys Dec. 21, 1937. O. E. SZEKELY 2,102,923
DRIVING AND SUPPORTING ASSEMBLY FOR AUTOMOTIVE VEHICLES
Filed Feb. 28, 1936 3 Sheets-Sheet 2
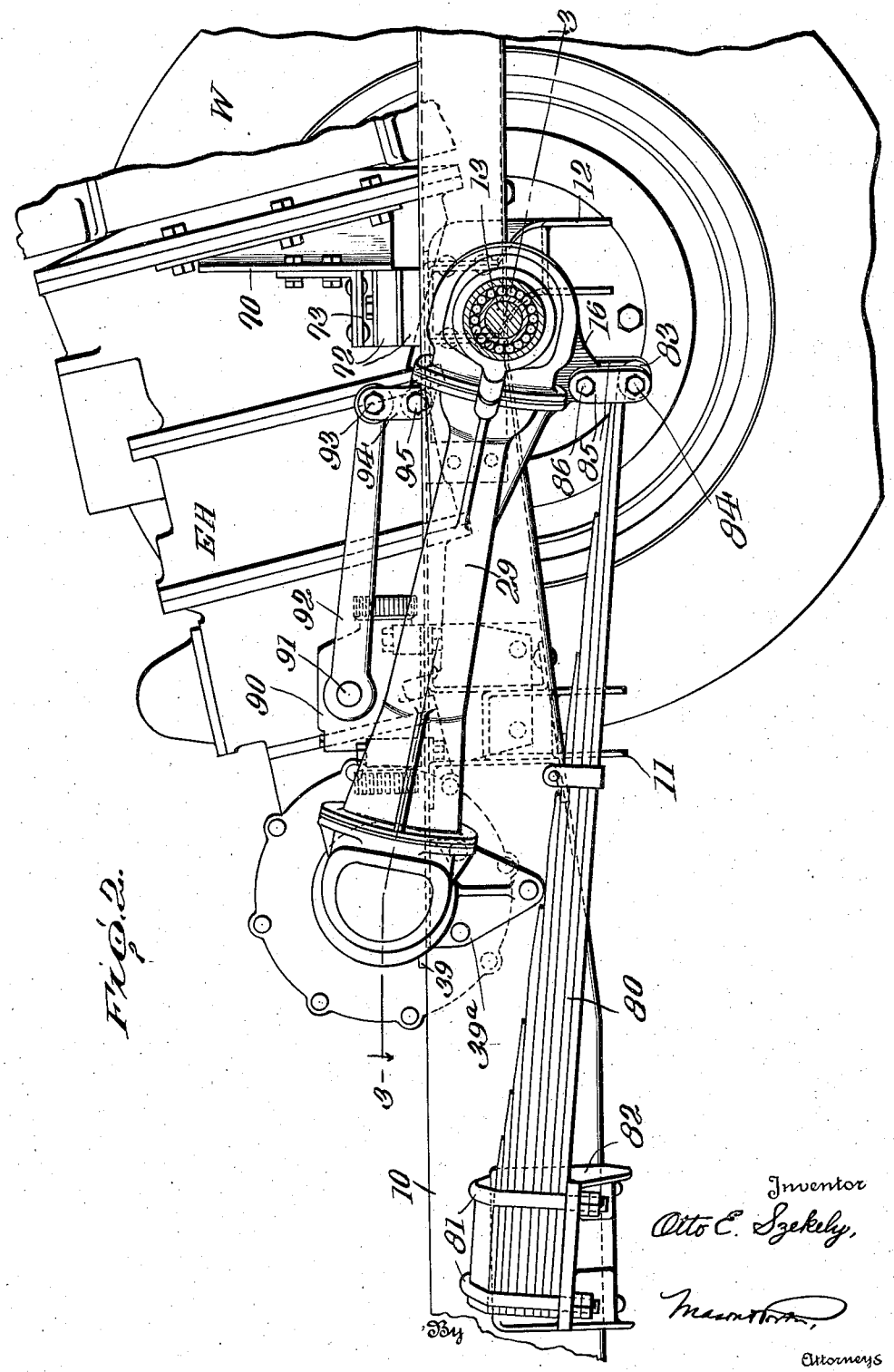

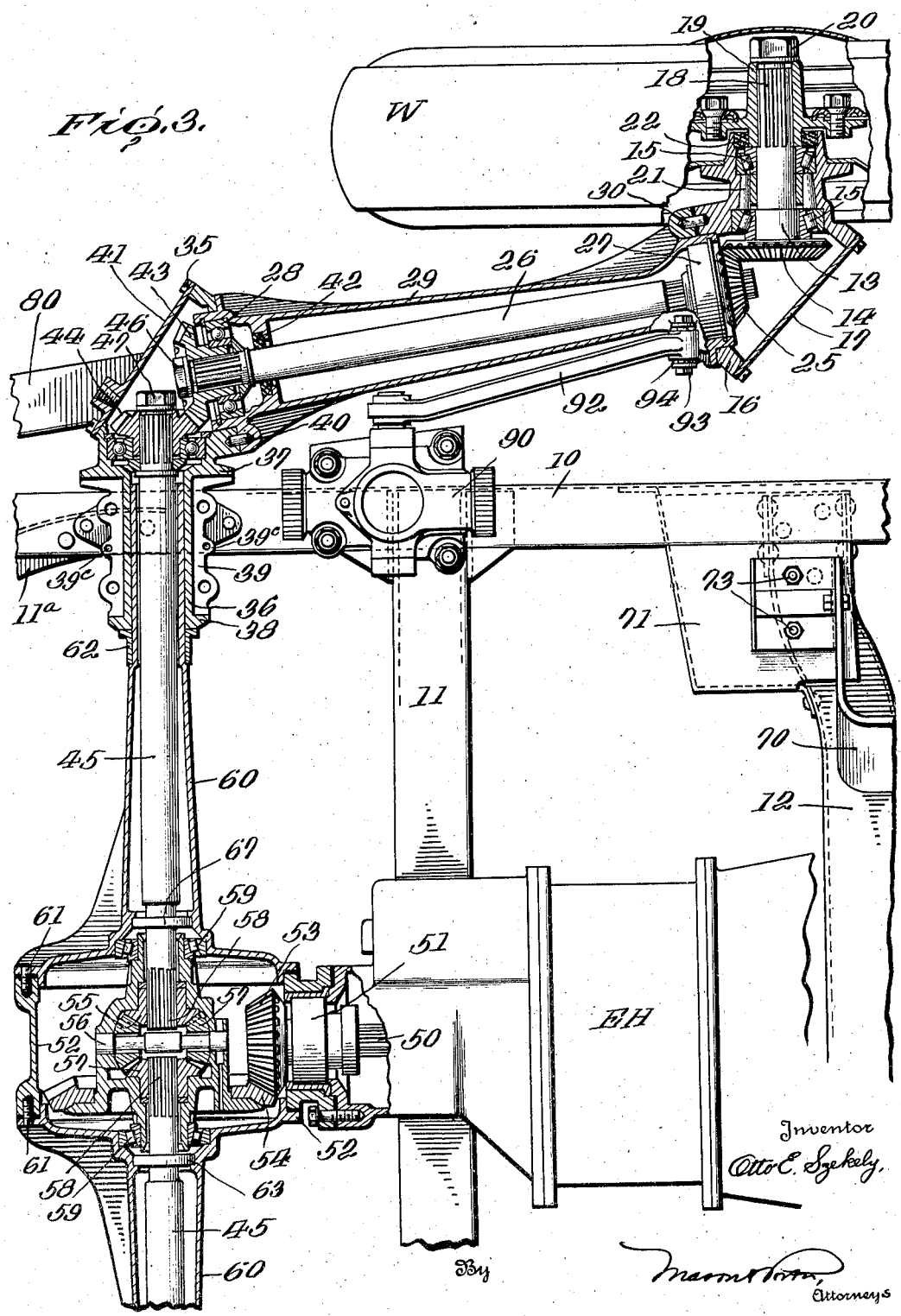

Patented Dec. 21, 1937

2,102,923

UNITED STATES PATENT OFFICE 2,102,923

DRIVING AND SUPPORTING ASSEMBLY FOR AUTOMOTIVE VEHICLES

Otto E. Szekely, Elmira, N. Y.

Application February 28, 1936, Serial No. 66,307

3 Claims. (Cl. 180—70)

The present invention relates to the assembly of parts employed in an automotive vehicle for providing a support to the load carrying structures and for driving the vehicle.

One of the features of the present invention is the provision of a vehicle having independently mounted driving wheels with force-transmission means for delivering relative thrusts at the wheel to the sprung portion of the vehicle structure independently of the spring means employed for the wheels.

Another feature of the present invention is the provision of a power and supporting assembly for the rear end of an automotive vehicle, comprising a power plant fixedly connected to the differential structure including shafts extending laterally and means for mounting the drive wheels independently and for providing the power drive thereto, and independent spring means for these wheels, the driving and mounting system operating to transmit forces relatively between the wheels and the sprung structure without thereby loading the spring means.

A further feature of the present invention is the provision of a power plant and wheel mounting assembly for independent wheels which can be easily disassembled by elements and can also be easily removed as a whole from the vehicle frame so that the assembly can be replaced and repaired as a unit.

Still another feature of the present invention is the provision of a power plant with transmission means and mounting means for independent driving wheels, the transverse axis of the driving wheels being longitudinally spaced from the transverse axis upon which the wheels are mounted for movement relative to the vehicle frame, the center of gravity of the power plant and associated parts being located intermediate said axes; and more particularly with the provision of separate leaf spring means for each wheel, the spring means being connected to the vehicle frame at points longitudinally spaced from said axis and being closer to the wheel mounting axis than to the wheel axis of the corresponding wheel.

A still further feature of the present invention is the provision of a power plant with associated driving means including a differential having transversely extending shafts and rearwardly extending rock arm structures for providing independent mountings for rear driving wheels, the center of gravity of the power plant and associated parts being located between the upright planes of the said transverse shafts and the axes of the wheels, together with separate leaf springs fixedly connected to the vehicle frame forwardly of said transverse shafts and loosely connected to the corresponding rock arms so that no thrusts are exerted from the wheels along the leaf springs.

With these and other features as objects in view, as will appear in the course of the following specification and claims, an illustrative form of practicing the invention is shown on the accompanying drawings, in which:

Figure 1 is a top plan view of a power plant connected with a driving and mounting system for the rear wheels of the automotive vehicle, indicating also portions of the rear end of the frame of this vehicle.

Figure 1a is a detail, on a corresponding scale, showing a plan view of the fixed mounting of a leaf spring on the frame.

Figure 2 is an upright sectional view, on a slightly larger scale, of the structures shown in Fig. 1, substantially on line 2—2 of Fig. 1.

Fig. 3 is a sectional view substantially on line 3—3 of Fig. 2, showing the driving and mounting system connected with the engine plant.

In these drawings, the automotive vehicle is illustrated as having a frame including the side members 10 with stiffening cross members 11, 12 connecting the side members. This frame is supported from wheels W which are independently mounted, as will be described hereinafter. Each of these wheels is provided (Fig. 3) with a stub shaft 13 having a bevel gear 14 on its inner end. The stub shaft is supported by anti-friction bearings 15 in a mounting head 16 illustrated as a casting providing a housing for the bevel gear 14 and its associated parts, and being closed by a plate 17. The stub shaft 13 has a splined end 18 for receiving the sleeve and flange structure 19 on which the wheel is supported. The nut 20 maintains the sleeve 19 in position. The relatively stationary brake parts are supported on the disk 21 fixed to the mounting head 16, and this mounting head is sealed at its outer end by a packing 22 to prevent the escape of lubricant provided in the mounting head for the bearings 15 and other relatively moving parts.

Located within the mounting head 16 is also the bevel gear 25 which is in mesh with the bevel gear 14 and provides the driving means therefor. This bevel gear 25 is splined on a rock arm shaft 26 carried by the anti-friction bearings 27, 28 at the ends of the hollow rock arm 29. The rearward or lower bearing 27 is indicated as employed to limit the motion of gear 25 away from gear 14 along the spline of shaft 26 under tooth pressure. The mounting head 16 is fixedly and rigidly connected to, though made in a separate piece from (in this illustrative form) the corresponding hollow rock arm 29. The accurate location of these parts may be attained by the use of locating dowels 30.

At the forward end of the rock arm 29, in this illustrative form, there is provided a second mounting head 35 which likewise is illustrated as formed of a casting and as having integral therewith a sleeve portion 36 extending toward the upright central longitudinal plane of the vehicle, and provided with an outer flange 37 and an inner flange 38. The span between these flanges, on bushing 36, is embraced by the bearing pieces 39 which are fixedly connected to the corresponding side frame members 10, and thus the wheel mounting assembly, comprised of the mounting head 35, the rock arm 29, the mounting head 16, and the wheel parts, is held to the vehicle frame although rocking about the axis of sleeve 36 is permitted. This forward mounting head 35 receives a forwardly projecting portion of the rock arm 29, and locating pins 40 may be employed to assure the proper positioning of these parts. This mounting head 35 is provided with a closing plate 41, so that it also forms a lubricant-containing chamber for the various bearings and gears located therein. This oil chamber is also sealed by a packing 42 located at the upper end of the hollow rock arm 29 and engaging the shaft 26.

At the forward end of the shaft 26 it is provided with splines for receiving the bevel gear 43 which is in mesh with a bevel gear 44 likewise splined on a transversely extending shaft 45 which is driven from the differential. The gear 43 is held on shaft 26 by a nut 46, and the gear 44 is held on shaft 45 by a nut 47.

The power plant is illustrated as comprising an engine having cylinder blocks CB connected to a crank case CC, this in turn being connected fixedly to the housing portions EH containing the clutch and transmission structures. The final drive from the change-speed transmission is accomplished by a shaft 50 supported by an antifriction bearing 51 in the portion 52 of the fixed power plant structure, this shaft 50 being preferably formed integrally with a bevel gear 53 which is in mesh with the ring gear 54 of the differential. This ring gear 54 is connected to the cage 55 in the differential which receives the radial pin 56 providing an axis for the two planet pinions 57 which are in mesh with the two sun gears 58. These sun gears have internal splines to receive the correspondingly splined ends of the transverse differential shafts 45. The gears are mounted for peripheral support in the cage 55, so that the shafts 45 may be withdrawn easily without provoking a separation of the differential housing tubes 60 which are flanged at their inner ends to fit the central portion 52 of the differential housing, and are connected thereto by bolts 61. The differential housing tubes 60 extend transversely of the vehicle and have their outer ends 62 received loosely within the sleeves 36, thus providing an internal support within these sleeves for stiffening the same and also to assure the alignment of the transverse shafts 45 with the axis of rocking of the arms 29 and the assemblies therewith. A packing 63 is provided adjacent the inner end of each of the housing tubes 60 for providing a lubricant seal for detaining lubricant in the differential housing.

The assembly of the engine and differential housing is rigid. The engine is fixed to the frame by the supports 70 which are connected (Fig. 2) to the housing assembly EH and to a reinforcement 71 of the corresponding side frame member 10 and the cross frame member 12, preferably with the inclusion of cushion pieces 72 (Fig. 2) for absorbing vibration, and through the employment of bolts 73. This rigid assembly of the power plant and differential is also fixed to the frame at its front end by the supporting pieces 39 described above. These supporting pieces are preferably split on a horizontal plane. The lower section 39a of each supporting piece preferably has a portion abutting a vertical face of the side members (Fig. 2). The two sections have abutting flanges for receiving the securing bolts 39b for holding the parts together; and it is preferred to employ locating dowels 39c (Fig. 3) for assuring the proper location of the two sections and thus the proper alignment of the power plant and engine assembly, and of the rock arms.

The rock arms are independently sprung with respect to the vehicle frame by the employment of spring means. The preferred spring means comprises leaf springs 80 which are connected fixedly to the side frames 10 by clamping bolts 81 engaging the fixed parts 82 abutting the lower and lateral faces of the side frame members 10 and fixedly secured thereto. The leaf spring assemblies are preferably straight in the normally loaded condition of the vehicle, and extend rearwardly beneath the rock arms 29 and are each provided with an eye 83 at the rear end for receiving the bolt 84 of the shackle links 85 which are connected by a further bolt 86 with a downward extension of the head 16. Thus the relative thrust of the wheel, when driven from the power plant or retarded by the brakes or other means, is transmitted to the vehicle frame along the corresponding rock arm 29 to the supporting pieces 39, and thus delivered directly to the side frame members 10. (It will be noted from Fig. 3 that it is preferred to have diagonal braces 11a connecting the side frames and joined thereto just forward of the supporting pieces 39.) The relative vertical movements of the wheel and its parts and of the rock arm 29 do not change this free relationship of the spring with respect to the wheel, as the shackle links 85 permit relative movements of these parts.

In order to prevent vibration and excessive amplitude of relative motion, the snubbers or shock absorbers 90 are fixed to the side frame members 10 at the connection points of the cross member 11. Each of these absorbers or snubbers has an operating shaft 91 extending to the exterior and provided with a crank arm 92 which is mounted with its free end above the corresponding head 16 (Fig. 1) and is provided with a pivot 93 connected to the links 94 which in turn are connected by a pivot 95 to the upper portion of the housing head 16. These links 94 operate correspondingly to the shackle links 85 to prevent any transmission of relative thrust between the wheel and frame along the crank arm 92 of the shock absorber. Hence this crank arm is operated only in response to the relative vertical movements of the wheel W and head 16 relative to the corresponding side frame member 10.

Thus it will be seen that the present assembly comprises a vehicle frame, a power plant supported on the frame and connected to the differential structure which has laterally extending housings 60 fixed to the frame by the supporting pieces 39; with the provision of independently mounted wheels each carried by a rock arm 29 mounted for pivotal movement about the axis of the transversely extending shafts of the differential, together with spring means for resiliently supporting the rock arms. A particular feature is the relationship in the loading of the structures. The axes of the wheel stub shafts 13 are rearward of the center of gravity of the power plant and differential assembly, while the axes of the transversely extending differential shafts 45 are forwardly of this center, in the present illustrative case where the power plant is mounted at the rear end of the vehicle. Further, the leaf springs 80 are connected to the rock arms closely adjacent the axis of the corresponding stub shaft 13 and are rigidly connected at the other end to the vehicle frame at points longitudinally spaced from the transverse axis of shafts 45, and thus beyond the aforesaid center of gravity. This arrangement provides an excellent assembly under operating conditions. When the power plant is operated to bring the vehicle into forward motion, each wheel W presses against the ground with a horizontal component directed toward the right in Fig. 2, corresponding to the reaction upon the wheel, and thus upon the arm 29 in a direction toward the left in Fig. 2. This tends to produce a relative clockwise movement of the rock arm 29 about the axis of the stub shaft 13, and provides a kinetic force operating to load the corresponding wheels against slippage during starting. This force tending to move the rock arm 29 in a clockwise direction is transmitted to the supporting pieces 39 as a tendency to raise the frame. Owing to the positioning of weights along this frame, and particularly owing to the position of the center of gravity of the engine plant forwardly of the axis of the stub shaft 13, the vehicle frame thus operates as a loaded lever under lifting pressure at an intermediate point of its length; and thus the reaction to the kinetic effect at starting (i. e. the response of the frame to this type of movement) is a function of the relative loading of the frame considered as a lever at different points of its length with respect to the diameter of the wheel W, the effective length of the rock arm 29, and the positioning of the rocking axis at the forward end of this arm with respect to the frame. Furthermore, it will be noted that the direction of rotation of the shafts 13, 26, 45 and the parts of the differential are such with respect to the engine-driven shaft 50 that the reaction in the engine is also tending to force the engine structure downwardly; and this in turn is operating through the engine supports to counteract any tendency of the rear end of the frame to rise, by the kinetic and pressure effects involved. Thus a powerful wheel pressure is attained at the driving wheels, without the necessity of having heavy dead weights loading these wheels, and without restricting the freedom of these wheels to respond to road conditions. This kinetic, as opposed to static, loading of the driving wheels also is advantageous as the springs 80 may be made relatively light in comparison with the actual pressure which can be developed between the wheels and the ground, and the unsprung weight is small.

Obviously, a reverse condition occurs when the driving wheels are being braked; and in this case the pressures and reactions are being exerted in the opposite horizontal direction and direction of rotation, but with the same ultimate effect of producing a kinetic loading of the driven wheels for maintaining them against slipping, this kinetic effect of braking becoming so much the greater, the greater the retardation effect delivered at the brakes.

A particular phase of the design of the present arrangement is that the parts lend themselves to easy and convenient disassembly. It is possible to remove the power plant as a whole (after suitably supporting the rear end of the frame) by releasing the springs and snubbers at the bolts 86, 95, for example, removing the upper sections of the supporting pieces 39, and removing the engine supporting bolts 73. The entire power plant, transmission system, differential, rock arms, and wheels may then be readily supported and removed, and a substitute unit immediately put in position and secured in place. The removed unit can then be examined, repaired, and tested as a whole. This faculty is important as it permits the proper alignment of all parts of the driven system. It will also be noted that minor disassemblies and substitutions can readily be made. The separation of a head 16 from the rear end of a rock arm 29 permits immediate disassembly of the corresponding wheel W and all its parts, and these structures can then be immediately replaced in case of any defect or difficulty. For example, imperfect brake bands can be replaced without throwing the entire automobile out of service.

If difficulty develops in the transverse shaft or rock arm, the loosening of the top section of the opposite supporting piece 39 and the removal of the adjacent top section will permit the slight tilting of the differential assembly and the separation of the sleeve 36 of the corresponding rock arm. The spline at the inner end of the transverse shaft 45 slips out of its gear 58, and thus the assembly from the splined end of this shaft, including the rock arm and wheel, may be readily removed (with, of course, the aforementioned separation from the spring and snubber structures).

Likewise, it will be noted that the closing plates 17 and 41 permit easy inspection of the structures within the heads 16 and 35. These heads are provided with seals adjacent their lower or outer ends, and operate in conjunction with the seal 63 to provide separate lubricant chambers or reservoirs for the various parts; one such chamber being provided around the differential structures and within the housings 52, another around the bevel gears 43, 44, and a third at the rearward end of the rock arm for proper lubrication of the lower end of this rock arm shaft 26 and for the bevel gears 14, 25 and the bearings 15 for the wheel mounting.

While a preferred form of construction has been illustrated and described, it is obvious that the invention may be employed in many other ways without departing from the scope of the appended claims.

I claim:

1. A rear wheel drive and suspension for a vehicle having a load receiving structure, comprising a pair of rock arms, each having separable forward and rear heads and a connecting tube; independent wheels mounted in the rear heads for rotation; means located in the heads and tubes for driving the wheels; each forward head being individually pivotally mounted on the structure; independent springs fixedly attached at their forward ends to the said structure forwardly of the driving means and each attached at the rear end to a corresponding rock arm adjacent the rear end thereof by a connection effective for transferring relative vertical motion and permitting therewith flexing movement of the spring without substantial transfer of longitudinal forces along the corresponding spring, and motion-retarding means connecting the structure and rear heads for controlling the relative movements permitted by said springs, said motion-retarding means being constructed and arranged to be free of thrust therealong when the corresponding wheel and rock arm move relative to the structure.

2. In a rear assembly for a vehicle having a frame, an engine and a differential casing rigidly secured together, differential drive means in said casing and operatively connected to the engine, said casing including lateral hollow extensions, laterally extending shafts driven differentially from said differential drive means and located in said extensions, said shafts having a common axis located forward of the center of gravity of the engine and differential drive means, means on the frame for supporting the engine and lateral extensions, an arm at each side of the vehicle pivoted for rocking about the axis of said shafts and extending rearwardly, wheels mounted on the arms at points rearwardly of the center of gravity of the engine and differential drive means, springs operatively connected to the frame and the arms, and individual drive connections from said shafts to said wheels.

3. In a rear assembly for a vehicle having a frame, an engine and a differential casing rigidly secured together, differential drive means in said casing and operatively connected to the engine, said casing including lateral hollow extensions, laterally extending shafts driven differentially from said differential drive means and located in said extensions, said shafts having a common axis located forward of the center of gravity of the engine and differential drive means, means on the frame for supporting the engine and lateral extensions, an arm at each side of the vehicle pivoted for rocking about the axis of said shafts and extending rearwardly, wheels mounted on the arms at points rearwardly of the center of gravity of the engine and differential drive means, leaf springs having connections to the frame forwardly of the shafts and connections to the arms adjacent the rear ends thereof, said connections including yielding portions for preventing the transmission of thrusts along the leaf springs between the wheel and frame, and individual drive connections from said shafts to said wheels.

OTTO E. SZEKELY.